United States Patent
Liang et al.

(10) Patent No.: US 11,376,682 B2
(45) Date of Patent: Jul. 5, 2022

(54) METHOD AND DEVICE FOR REMOVING ELECTROMAGNETIC CORE

(71) Applicant: ACCUTEX TECHNOLOGIES CO., LTD., Taichung (TW)

(72) Inventors: Jui Fang Liang, Taichung (TW); Cheng Ying Lin, Taichung (TW)

(73) Assignee: ACCUTEX TECHNOLOGIES CO., LTD., Taichung (TW)

( * ) Notice: Subject to any disclaimer, the term of this patent is extended or adjusted under 35 U.S.C. 154(b) by 335 days.

(21) Appl. No.: 16/689,845

(22) Filed: Nov. 20, 2019

(65) Prior Publication Data

US 2020/0164451 A1 May 28, 2020

(30) Foreign Application Priority Data

Nov. 28, 2018 (TW) ................................. 107142479

(51) Int. Cl.
*B23H 11/00* (2006.01)
*B23H 7/02* (2006.01)
(Continued)

(52) U.S. Cl.
CPC ............... *B23H 11/00* (2013.01); *B23H 7/02* (2013.01); *B23H 7/08* (2013.01); *B23Q 3/15* (2013.01)

(58) Field of Classification Search
CPC . B23H 11/00; B23H 7/08; B23H 7/02; B23Q 3/15
See application file for complete search history.

(56) References Cited

U.S. PATENT DOCUMENTS

| | | | | |
|---|---|---|---|---|
| 5,015,814 A | * | 5/1991 | Morishita | ................ B23H 7/02 219/69.12 |
| 5,177,334 A | * | 1/1993 | Magara | .................... B23H 7/04 219/69.12 |

(Continued)

FOREIGN PATENT DOCUMENTS

| | | | |
|---|---|---|---|
| JP | 04063629 A | * | 2/1992 |
| JP | 06304817 A | * | 11/1994 |
| JP | 08019919 A | * | 1/1996 |

OTHER PUBLICATIONS

Machine translation of Japan Patent No. 04063629A (Year: 2021).*
Machine translation of Japan Patent No. 06304817A (Year: 2021).*
Machine translation of Japan Patent No. 08019919A (Year: 2021).*

*Primary Examiner* — Geoffrey S Evans
(74) *Attorney, Agent, or Firm* — Muncy, Geissler, Olds & Lowe, P.C.

(57) ABSTRACT

A method and device for removing an electromagnetic core, the method including: using an electromagnet to magnetize or demagnetize a metallic upper nozzle when a magneto-conductive workpiece is cut off in a WEDM manner; attracting a core capable of being completely cut off and separated in the workpiece; utilizing the metallic upper nozzle to detect whether attracted; if the core is attracted, moving the core to a target area; demagnetizing and dropping the core in a trash area. The device is applied to a WEDM machine; after the metallic magneto-conductive upper nozzle is magnetized by the electromagnet, the upper nozzle is used to attract the magneto-conductive core; a metallic water spray cover is utilized to detect whether the core is attracted; the core is moved to the target area by a motion system of the WEDM machine, and dropped in a trash device after the upper nozzle is demagnetized.

21 Claims, 7 Drawing Sheets

(51) Int. Cl.
 *B23Q 3/15* (2006.01)
 *B23H 7/08* (2006.01)

(56) References Cited

U.S. PATENT DOCUMENTS

| | | |
|---|---|---|
| 9,993,888 B2 | 6/2018 | Kasai et al. |
| 2016/0059369 A1 | 3/2016 | Minotti et al. |

* cited by examiner (a)

(b)

METHOD AND DEVICE FOR REMOVING ELECTROMAGNETIC CORE

TECHNICAL FIELD

The present invention relates to a method applied to a linear electrode discharge machining system, and used for using a powered electromagnet to perform magnetization when a magneto-conductive material is cut in a wire-cut electrical discharge machining manner, in particular to a method and device for attracting and removing a core capable of being completely cut off and separated. A wire-cut electrical discharge machine can be used in the field of mold machining. At present, more than 90% of the molds in the manufacturing industry are magneto-conductive metal material, and therefore, the electromagnet magnetization method is especially suitable for attracting and removing the core.

PRIOR ART

A wire-cut electrical discharge machine is used in the field of mold machining; when a shape machining path is completed, a large number of cutoff waste materials need to be manually picked up and removed one by one, which requires a lot of manpower in an automatic manufacturing process, especially when the wire-cut electrical discharge machine is used to machine a punch die; the core of a workpiece generally has a repeated and simple geometric pattern; the completely separated core will not be used in subsequent machining, and must be removed before the subsequent machining, so as to facilitate the smooth execution of subsequent machining processes. In the method used in conventional machining processes, a small section of incompletely cut off machining path will be reserved before a plurality of cores are cut off. After manpower is utilized, the plurality of cores are cut off, and are manually removed from the workpiece; and finally, the subsequent machining actions are executed, which extremely consumes manpower and man-hour.

In the conventional wire-cut electrical discharge machines (WEDM), the American invention patent No. U.S. Ser. No. 00/517,334 discloses an attraction device using a permanent magnet; in an embodiment thereof, a nozzle head has permanent magnetism, and can attract the machined material; in order to release the attracted workpiece, an AC power supply circuit must be used to provide an electromagnetic coil to demagnetize the magnetized nozzle head; the permanently magnetized attraction device is easy to permanently magnetize the machined material (template), and the effect of magnetic induction will also have an influence on the physical properties of the material.

As disclosed by the American invention application patent No. US2016/0059369A1, in a conventional technology of the wire-cut electrical discharge machine, a vacuum device utilizes a negative pressure to generate a lift force to remove the waste materials generated during machining; however, the effectiveness using the vacuum device to attract a waste material is dependent on the contact surface condition of the removed waste material; for the waste material having a rough, step-like, porous or uneven surface, the attraction effectiveness will be greatly reduced; the patent further discloses a clamper designed by Bernoulli's law in hydrodynamics; in a conventional wire-cut electrical discharge machine, the clamper is fixedly or movably mounted on an upper machine head; the clamper can move to a position with the bottom thereof facing the core of a workpiece; the clamper is provided with a liquid inlet and a liquid outlet at the bottom; a fluid under a positive pressure can enter the clamper from the liquid inlet, and can leave the clamper from the liquid outlet; the clamper is internally provided with a structure for guiding the fluid to flow; when the fluid leaving the clamper from the liquid outlet flows, a low pressure area is generated at the bottom of the clamper; the clamper can utilize the high and low pressures generated by sprayed positive pressure liquid flow to remove the waste material generated in wire-cut electrical discharge machining; however, the Bernoulli clamper cannot effectively remove the waste materials in small sizes (for example, the materials in diameters less than o4 mm).

In addition, as disclosed by the American invention patent No. U.S. Pat. No. 9,993,888B2, in the conventional wire-cut electrical discharge machine, when the machined core is completely separated from the workpiece, a lower nozzle at a lower position sprays a fluid, such that the separated core can float upwards; after a sensor detects the waste material, or the core floats to a preset height by the machining process, a core removal unit grabs the waste material, removes and recover the core. The technologies disclosed in the prior art either cannot firmly clamp a too small waste material, or cannot effectively lift a too large waste material.

The present invention provides a method and device for removing an electromagnetic core, mainly used to reduce the demand for manpower in the mold machining of a magneto-conductive metal material; the electromagnet magnetization type device and apparatus can automatically and effectively attract and remove a core.

SUMMARY OF THE INVENTION

The present invention provides a method for removing an electromagnetic core, comprising: when a magneto-conductive workpiece material is cut off in a wire-cut electrical discharge machining (WEDM) manner, magnetizing or demagnetizing a metallic upper nozzle by controlling the power on/off state of an electromagnet; attracting a core capable of being completely cut off and separated in a workpiece; utilizing the metallic upper nozzle to detect whether the core is attracted; after the core is attracted, moving the core to a target area; demagnetizing and dropping the core in a trash area.

The present invention provides a device for removing an electromagnetic core, applied to a wire-cut electrical discharge machine; after the metallic magneto-conductive upper nozzle is magnetized by the electromagnet, the upper nozzle is used to attract the magneto-conductive core capable of being completely cut off and separated; a metallic water spray cover is utilized to detect whether the core is attracted; a motion system of the wire-cut electrical discharge machine moves the core to the target area; and after the upper nozzle is demagnetized, the core is dropped in a trash device.

DETAILED DESCRIPTION OF THE EMBODIMENTS

Figure 1:
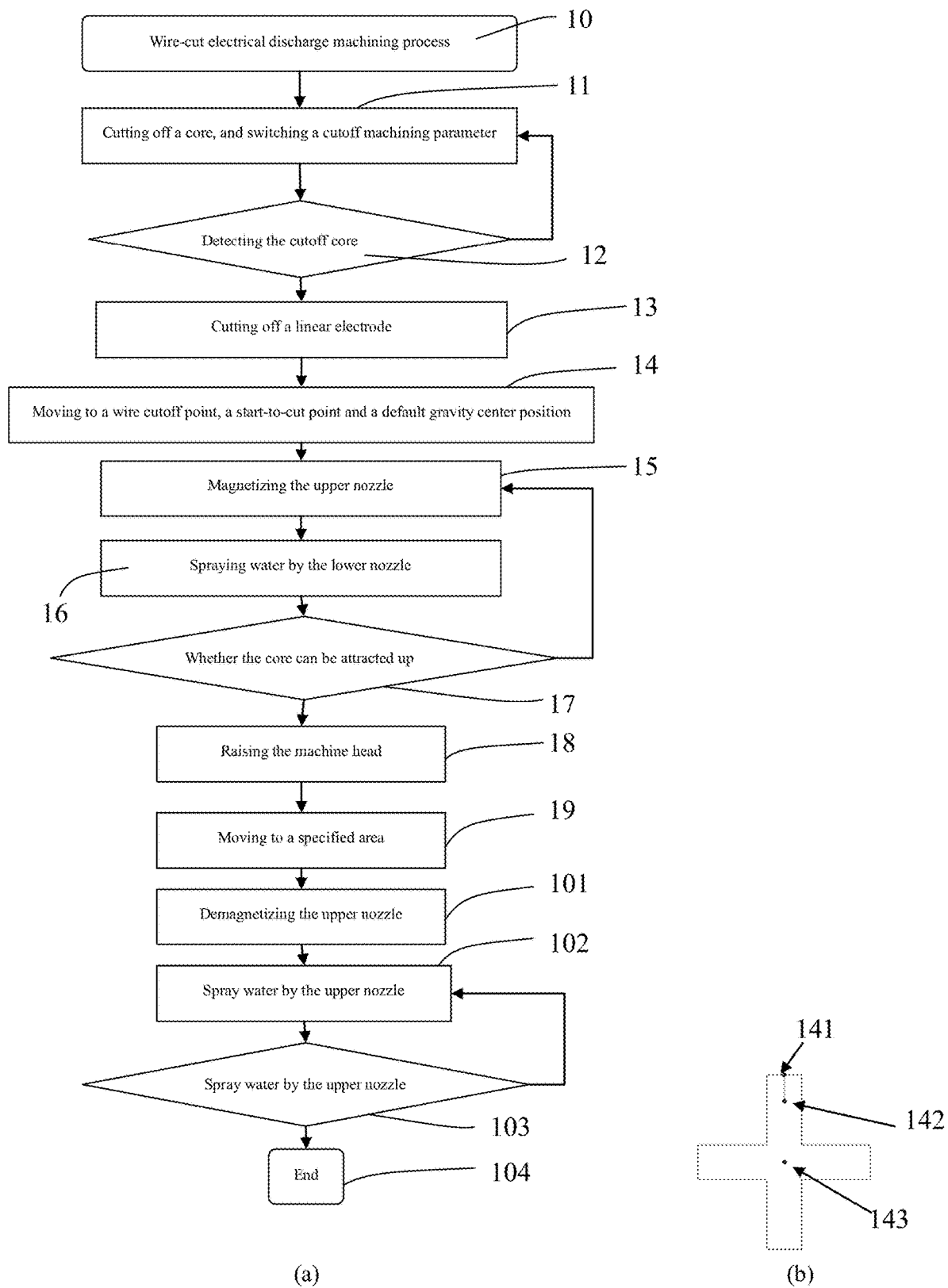
FIG. 1 is a flow chart and explanatory drawing of the method according to the present invention.

The present invention is a method and device for removing an electromagnetic core. FIG. 1(a) shows the process steps of the method; when a wire-cut electrical discharge machining process 10 is executed until the last path has (0.1 mm+wire diameter) left over, the step of cutting off the core and switching a cutoff machining parameter 11 is performed, so as to ensure that the core is cut off; detecting the cutoff core 12 means to determine whether the core is completely cut off via a detection loop, or via a detection function configured in controller software; if not, then the core is continuously cut off 11 until a wire-cut electrical discharge machining path shape is cut off completely; if so, then the next step is executed, namely cutting off a linear electrode 13, wherein the linear electrode is a cutting tool for wire-cut electrical discharge machining, is clamped by the upper and lower machine heads, and shall be sheared off before the upper and lower machine heads are moved; the step of moving to a wire cutoff point, a start-to-cut point and a default gravity center position 14 aims to improve the removal success rate; the upper machine head can be moved, together with the upper nozzle, to the wire cutoff point, or the start-to-cut point, or the default gravity center position of the shape machining path; as shown in FIG. 1(b), taking the machining path of a cross punch as an example, the position 141 is the wire cutoff point, the position 142 is the start-to-cut point, and the position 143 is the default gravity center position; in the step of magnetizing the upper nozzle 15, the upper nozzle in the upper machine head is switched on and magnetized, and starts to have a magnetic attraction force; then in the step of spraying water by the lower nozzle 16, the lower nozzle located in the lower machine head starts to spray water and help the core obtain an upward lift force; in the step whether the core can be attracted up 17, whether the core can be completely attracted up from the workpiece is determined; if not, then going back to the steps 15 and 16, until the core can be completely attracted up; if so, then the next step is executed, namely raising the machine head 18; the upper machine head attracts the core, and move away from the workpiece; in the step of moving to a specified area 19, a motion controller of the wire-cut electrical discharge machine moves the core attracted by the upper nozzle to a specified area position; in the step of demagnetizing the upper nozzle 101, the upper nozzle in the upper machine head is switched off and demagnetized, and the attraction force of the upper nozzle disappears; in the step of spraying water by the upper nozzle 102, the upper nozzle also starts to spray water to generate a thrust force, so as to drop the core to a specified trash area; the step of spraying water by the upper nozzle 102 can be replaced with a reverse circuit demagnetization method, namely a reverse current is sent out in a short time to eliminate the magnetic hysteresis phenomenon of the upper nozzle and the electromagnet, so as to drop the core to the specified trash area; the step of spraying water by the upper nozzle 102 can be replaced with a mechanism scraping action, namely a collecting device and core relatively move close to each other, until the core can be scraped off by the upper nozzle; in the step of determining whether the core is dropped 103, if not, then going back to the step 102 to persistently spray water; and if so, then the step end 104 arrives, and the method for removing an electromagnetic core is executed completely.

Figure 2:
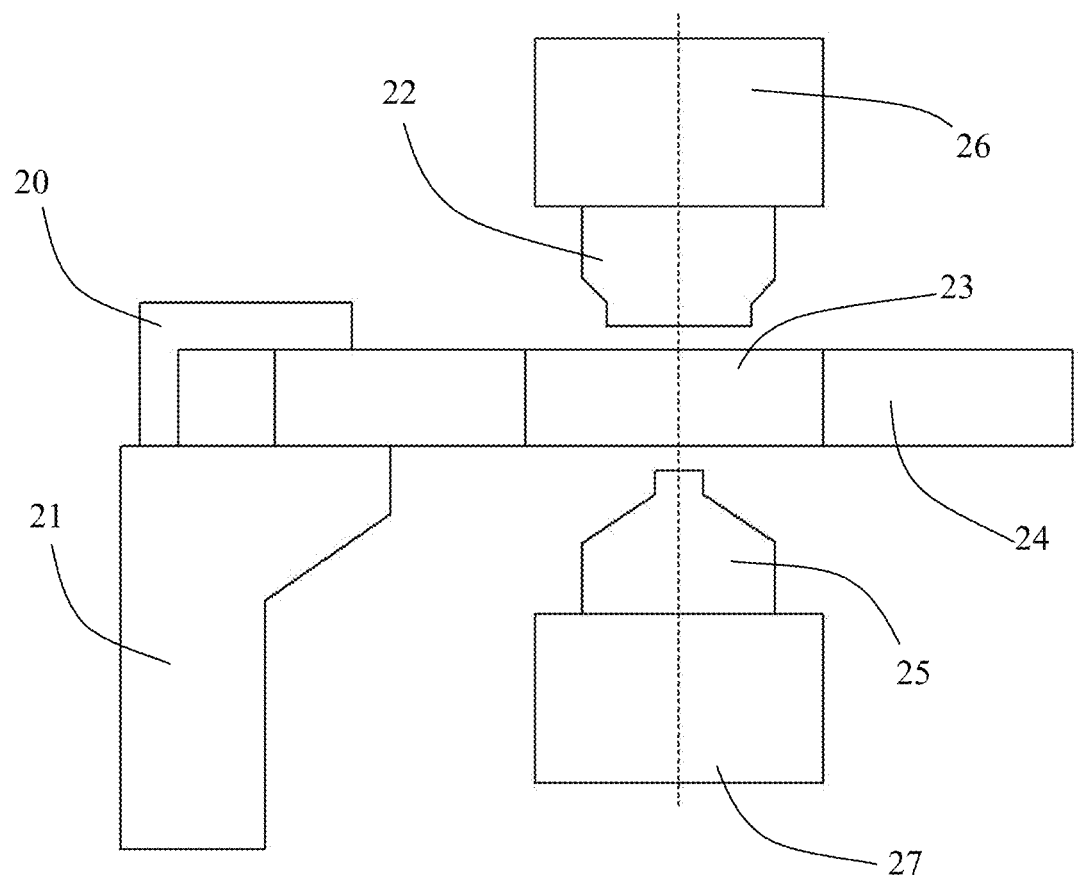
FIG. 2 is a schematic view of a structural section of the device according to one embodiment of the present invention.

The present invention is a method and device for removing an electromagnetic core; the actions of the device are as shown in FIG. 2 which is a structural section of one embodiment; when wire-cut electrical discharge machining is performed, the workpiece 24 is placed on an operating platform 21, and is fixed by a workpiece clamping fixture 20; when a shape machining path is completed, the core 23 is cut off and separated from the workpiece; the upper nozzle 22 in the upper machine head 26 starts to be switched on and magnetized; the lower nozzle 25 of the lower machine head 27 sprays water to generate an upward lift force to the core 23; the gap between the core 23 and the upper nozzle 22 is reduced to facilitate attraction.

Figure 3:
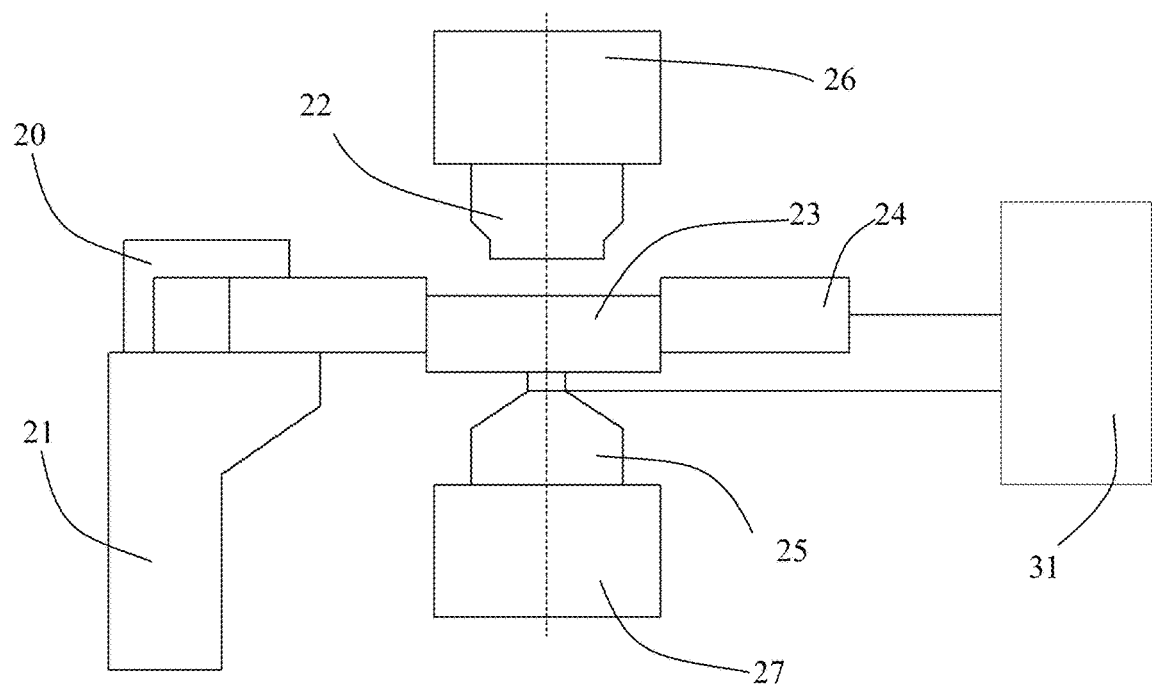
FIG. 3 is another schematic view of a structural section of the device according to one embodiment of the present invention.
Figure 3:
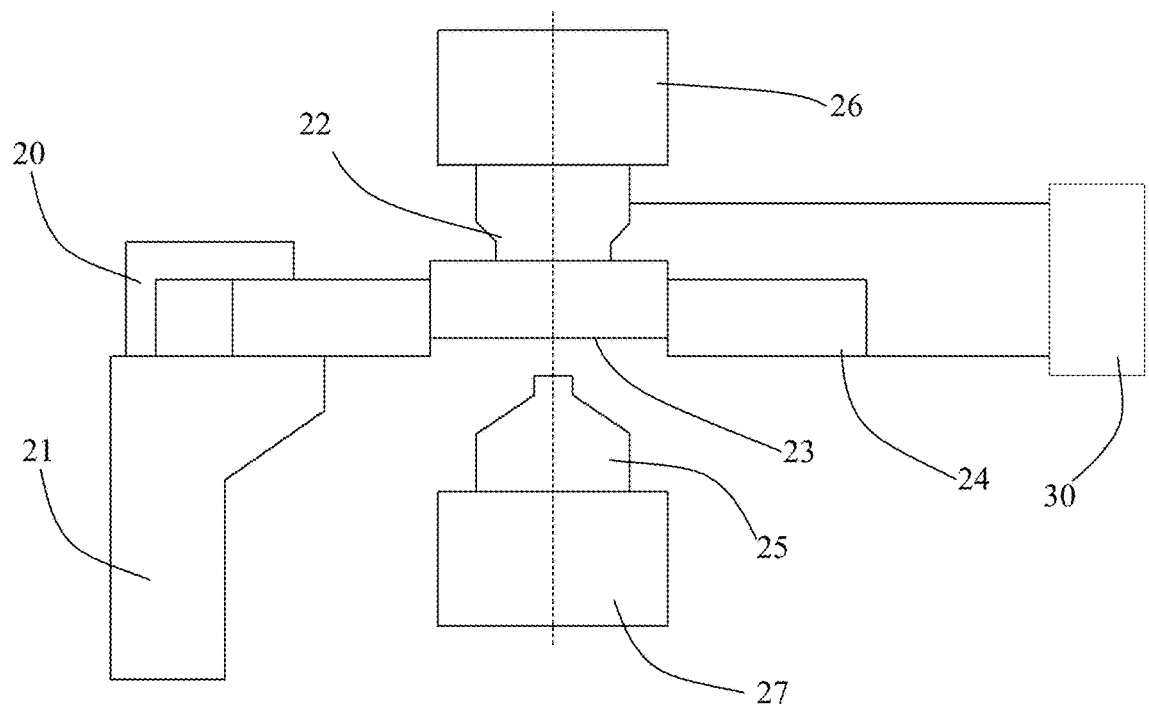

FIG. 3 is another schematic view of a structural section of the device according to one embodiment of the present invention. In FIG. 3(a), a cutoff detection loop 31 is electrically connected the lower nozzle 25 and the workpiece 24; when the core 23 is cut off and dropped, the core contacts the lower nozzle 25 to form a loop; the function of detecting whether the core 23 is cut off is achieved according to whether the loop is conducted; in FIG. 3(b), an attraction detection loop 30 is electrically connected to the upper nozzle 22 and the workpiece 24; after the core 23 is attracted, the electrically-conductive and magneto-conductive upper nozzle 22 and the workpiece 24 form a loop; the function of checking whether the core 23 is attracted by the magnetized upper nozzle 22 is achieved according to whether the loop is conducted; if the core is not attracted by the upper nozzle 22, then the lower nozzle 25 persistently sprays water to help the core 23 get close to the upper nozzle 22; if the core is attracted by the upper nozzle, then the upper machine head 26 is lifted to a specified height, and the motion controller of the wire-cut electrical discharge machine moves the upper machine head 26, together with the core 23 attracted by the upper nozzle 22, to a target area; the upper nozzle 22 is switched off and demagnetized, and the core 23 is dropped in the specified trash area.

Figure 4:
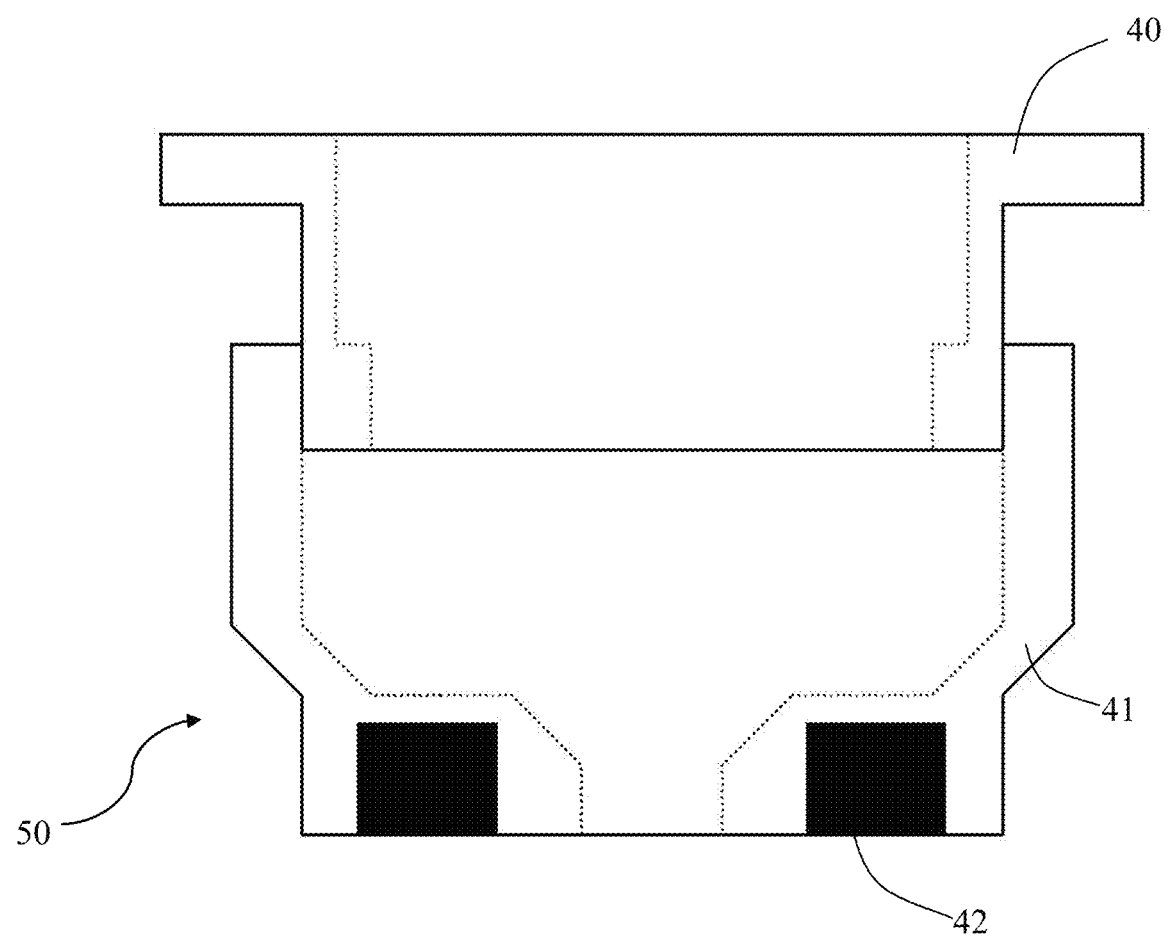
FIG. 4 is a sectional schematic view of the device according to the present invention.

FIG. 4 is a sectional schematic view of the device according to the present invention; an electromagnetic attraction device 50 is sleeved on an upper water cover upper part 40; the electromagnetic attraction device 50 comprises a magneto-conductive upper water cover lower part 41; the upper water cover lower part 41 is internally provided with a surrounding electromagnetic coil 42; the input power supply of the electromagnetic coil 42 is controlled by a controller; and the magneto-conductive upper water cover lower part is controlled to attract the magneto-conductive core. The electromagnetic attraction device 50 can be placed in the upper nozzle 22; a motion control system of the wire-cut electrical discharge machine moves the upper machine head 26, together with the core attracted by the upper nozzle 22, to the specified area, thus realizing the core removal function.

Figure 5:
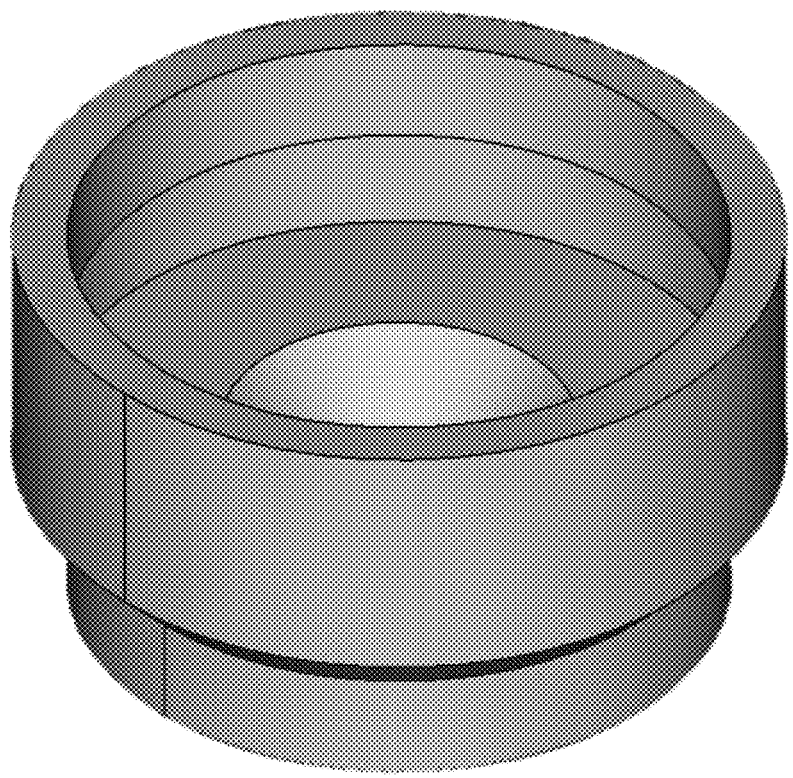
FIG. 5 is a schematic view of the 3D stereoscopic appearance of the device according to the present invention.
Figure 5:
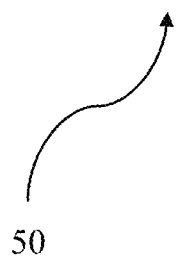
Figure 6:
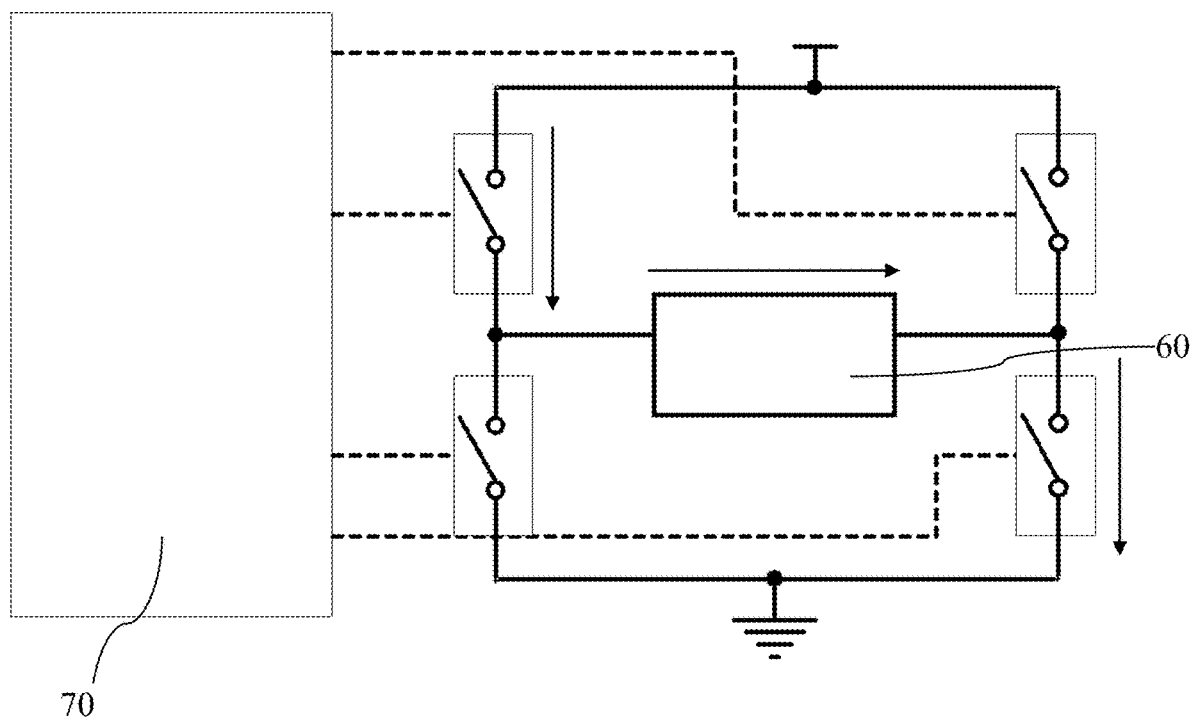
FIG. 6 is a schematic view of the magnetizing current direction of the device according to the present invention.
Figure 7:
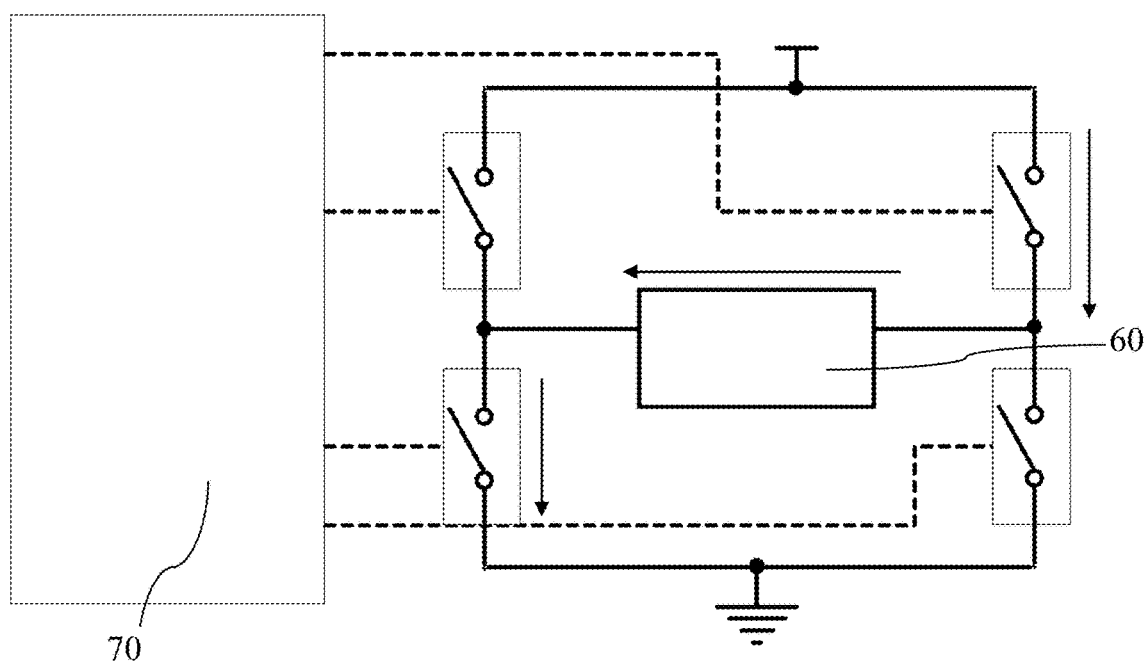
FIG. 7 is a schematic view of the demagnetizing current direction of the device according to the present invention.

FIG. 5 is a schematic view of the 3D stereoscopic appearance of the device according to the present invention; the electromagnetic attraction device 50 is made from a magneto-conductive metal material, and is internally provided with an electromagnet coil; the electromagnet coil generates a magnetization action, and can also be electrically connected to the attraction deletion loop to determine whether the core is attracted. FIG. 6 is a schematic view of the magnetizing current direction of the device according to the present invention; the input power supply of the electromagnet 60, and the direction of the magnetizing current are controlled by a self-made control circuit 70. FIG. 7 is a schematic view of the demagnetizing current direction of the device according to the present invention; the input power supply of the electromagnet 60, and the direction of the demagnetizing current acting in a short time are controlled by the self-made control circuit 70. After being demagnetized, the electromagnet 60 may have a residual magnetic force. Therefore, a full bridge circuit is used to perform long time forward magnetization; the demagnetization is to send out a reverse current in a short time to eliminate the magnetic hysteresis phenomenon of the electromagnet 60, such that the electromagnetic attraction device 50 is demagnetized and the core 23 is dropped.

Figure 8:
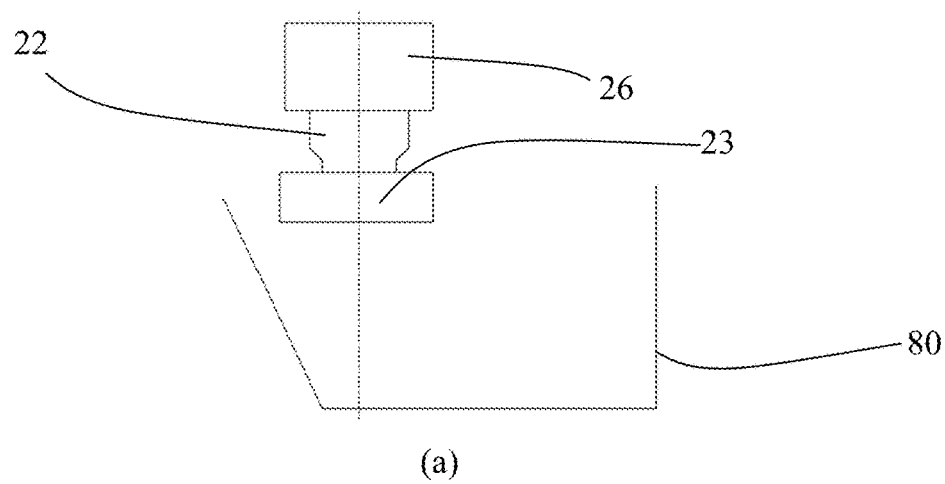
FIG. 8 is a schematic view how a structure of the device scrapes off the core according to the present invention.
Figure 8:
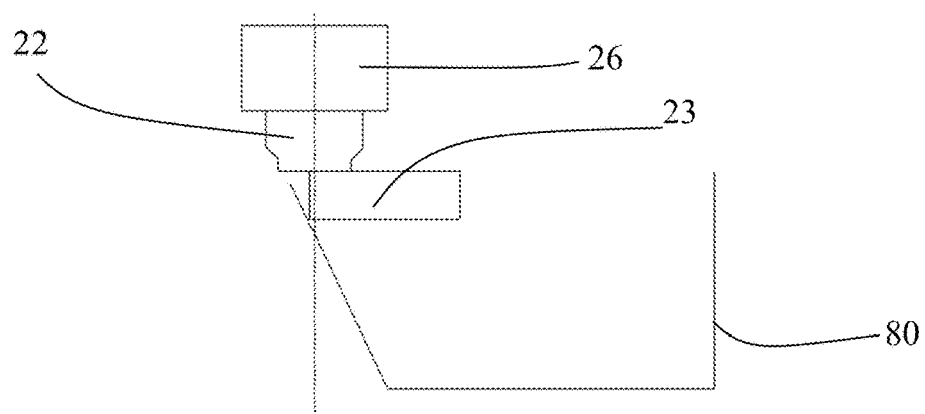
Figure 8:
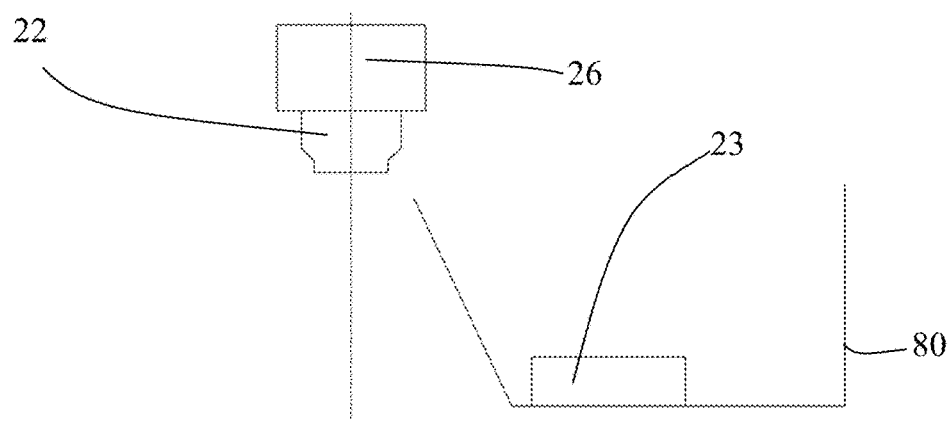

FIG. 8 is a schematic view how a structure of the device scrapes off the core according to the present invention. After being demagnetized, the electromagnet 60 may have a residual magnetic force. Therefore, another core removal method is provided as follows: a core collecting box 80 is used to scrape off the core; as shown in FIG. 8(a), the upper nozzle 22 in the upper machine head 26 already attracts the core 23; in FIG. 8(b), the core collecting box 80 and the core 23 relatively move close to each other; and in FIG. 8(c), an edge of the core collecting box 80 relatively moves and scrapes off the core 23, and the core 23 is dropped in the core collecting box 80.

What is claimed is:

1. A method for removing an electromagnetic core, mainly comprising the steps of:
   when the execution of a wire-cut electrical discharge machining shape is nearly completed,
   determining by a cutoff detection loop whether a core is completely cut off and separated, and then starting to perform electromagnetic core removal;
   if not, then continuing to perform discharge machining to cut off the core, and switching a cutoff machining parameter until the core is separated;
   if so, the core, the workpiece and the lower nozzle form a loop, then magnetize an electromagnetic attraction device starting to switch on, enabling the electromagnetic attraction device to have a magnetic attraction force;
   determining by an attraction detection loop whether the core can be completely attracted up;
   if not, then continuing to magnetize the electromagnetic attraction device;
   if so, the core, the workpiece and the electrically-conductive and magneto-conductive upper nozzle form a loop, then the attracted core moving to a specified area position;
   demagnetizing the electromagnetic attraction device;
   determining whether the core is dropped; if not, then using an upper nozzle to persistently spray water to and separate the core below; if so, then ending the core dropping determination step;
   separating the core from the electromagnetic attraction device, and dropping the core in a specified trash area.

2. The method for removing an electromagnetic core according to claim 1, wherein the step of determining whether a core is completely cut off and separated is executed by controller software having a detection function.

3. The method for removing an electromagnetic core according to claim 2, wherein the electromagnetic attraction device is disposed in a magneto-conductive upper nozzle.

4. The method for removing an electromagnetic core according to claim 3, wherein the upper nozzle is moved to a wire cutoff point to remove the electromagnetic core.

5. The method for removing an electromagnetic core according to claim 4, wherein a lower nozzle sprays water to the core to generate an upward thrust force, enabling the core to get close to the electromagnetic attraction device.

6. The method for removing an electromagnetic core according to claim 5, wherein a motion controller of the wire-cut electrical discharge machine moves an upper machine head, together with the core attracted by the upper nozzle, to the specified area position.

7. The method for removing an electromagnetic core according to claim 6, wherein when the core is determined not dropped, a reverse circuit demagnetization step is adopted; namely, a reverse current is sent out in a short time to eliminate the magnetic hysteresis attraction of the upper nozzle and the electromagnet, such that the core can be separated.

8. The method for removing an electromagnetic core according to claim 7, wherein when the core is determined not dropped, a mechanism scraping step is adopted; namely, a collecting device and the core relatively move close to each other, until the core can be scraped off by the upper nozzle.

9. The method for removing an electromagnetic core according to claim 3, wherein the upper nozzle is moved to a start-to-cut point to remove the electromagnetic core.

10. The method for removing an electromagnetic core according to claim 9, wherein a lower nozzle sprays water to the core to generate an upward thrust force, enabling the core to get close to the electromagnetic attraction device.

11. The method for removing an electromagnetic core according to claim 10, wherein a motion controller of the wire-cut electrical discharge machine moves an upper machine head, together with the core attracted by the upper nozzle, to the specified area position.

12. The method for removing an electromagnetic core according to claim 11, wherein when the core is determined not dropped, a reverse circuit demagnetization step is adopted; namely, a reverse current is sent out in a short time to eliminate the magnetic hysteresis attraction of the upper nozzle and the electromagnet, such that the core can be separated.

13. The method for removing an electromagnetic core according to claim 12, wherein when the core is determined not dropped, a mechanism scraping step is adopted; namely, a collecting device and the core relatively move close to each other, until the core can be scraped off by the upper nozzle.

14. The method for removing an electromagnetic core according to claim 3, wherein the upper nozzle is moved to a default gravity center position to remove the electromagnetic core.

15. The method for removing an electromagnetic core according to claim 14, wherein a lower nozzle sprays water to the core to generate an upward thrust force, enabling the core to get close to the electromagnetic attraction device.

16. The method for removing an electromagnetic core according to claim 15, wherein a motion controller of the wire-cut electrical discharge machine moves an upper machine head, together with the core attracted by the upper nozzle, to the specified area position.

17. The method for removing an electromagnetic core according to claim 16, wherein when the core is determined not dropped, a reverse circuit demagnetization step is adopted; namely, a reverse current is sent out in a short time to eliminate the magnetic hysteresis attraction of the upper nozzle and the electromagnet, such that the core can be separated.

18. The method for removing an electromagnetic core according to claim 17, wherein when the core is determined not dropped, a mechanism scraping step is adopted; namely, a collecting device and the core relatively move close to each other, until the core can be scraped off by the upper nozzle.

19. A device for removing an electromagnetic core, disposed in a wire-cut electrical discharge machine, and mainly comprising:
- a control circuit, for controlling an input power supply to generate a magnetization action and a demagnetization action;
- an insulating upper water cover upper part;
- a coil, for magnetizing an electromagnet; and
- a detection device, wherein the detection device is electrically connected to an electrically-conductive and magneto-conductive upper nozzle, and after the core is attracted, the detection device is electrically connected to a workpiece, thus forming a complete loop; whether the core is attracted can be detected according to whether the loop is switched on the detection device can also be electrically connected to an electrically-conductive lower nozzle, and after the core is dropped and contacts the lower nozzle, the detection device is electrically connected to the workpiece, thus forming a complete loop; and the loop is used to detect whether the core is cut off and separated, wherein the control circuit controls the attraction force of the electromagnet; the magneto-conductive core is attracted and moved to a specified area; whether the core is dropped is detected; if not, then the upper nozzle is activated to persistently spray water to the core below until the core is separated; and the core is dropped and removed.

20. The device for removing an electromagnetic core according to claim 19, wherein the control circuit can send out a reverse current in a short time to eliminate a residual magnetic force after the electromagnet is demagnetized.

21. The device for removing an electromagnetic core according to claim 20, wherein an edge of a core collecting box and the core relatively move to scrape off the core.

* * * * *